United States Patent [19]

Betker et al.

[11] Patent Number: 5,279,672

[45] Date of Patent: Jan. 18, 1994

[54] AUTOMATIC CONTROLLED CLEANING MACHINE

[75] Inventors: Mark Betker, Castle Rock; Frederick M. Bores, Highlands Ranch; Edward T. Biegel, Littleton; Thomas Francis, Denver, all of Colo.

[73] Assignee: Windsor Industries, Inc., Englewood, Colo.

[21] Appl. No.: 906,102

[22] Filed: Jun. 29, 1992

[51] Int. Cl.⁵ .................... A47L 11/16; B62D 1/24
[52] U.S. Cl. .................... 134/18; 15/49.1; 15/50.1; 15/319; 15/320; 15/340.4; 134/6; 134/21; 180/169; 318/587; 901/1
[58] Field of Search .......... 15/49.1, 50.1, 50.2, 15/50.3, 52, 98, 319, 340.1, 340.4, 320; 134/6, 18, 21; 180/169; 901/1; 318/587

[56] References Cited

U.S. PATENT DOCUMENTS

| | | | |
|---|---|---|---|
| 4,674,048 | 6/1987 | Okumura | 364/424 |
| 4,675,935 | 6/1987 | Kasper et al. | 15/319 |
| 4,700,427 | 10/1987 | Knepper | 15/319 |
| 4,709,771 | 12/1987 | Basham et al. | 180/6.5 |
| 4,751,658 | 6/1988 | Kadonoff et al. | 364/513 |
| 4,790,402 | 12/1988 | Field et al. | 180/169 |
| 4,815,008 | 3/1989 | Kadonoff et al. | 364/513 |
| 4,815,840 | 3/1989 | Benayad-Cherif et al. | 356/1 |
| 4,821,192 | 4/1989 | Taivalkoski et al. | 364/424.02 |
| 4,846,297 | 7/1989 | Field et al. | 180/169 |
| 4,996,468 | 2/1991 | Field et al. | 318/587 |
| 5,005,128 | 4/1991 | Robins et al. | 364/424.02 |
| 5,020,620 | 6/1991 | Field | 180/169 |
| 5,032,775 | 6/1991 | Mizuno et al. | 318/587 |
| 5,051,906 | 9/1991 | Evans, Jr. et al. | 364/424.02 |
| 5,086,535 | 2/1992 | Grossmeyer et al. | 15/319 |

*Primary Examiner*—Edward L. Roberts
*Attorney, Agent, or Firm*—Sheridan, Ross & McIntosh

[57] ABSTRACT

A robotic cleaning apparatus is disclosed. The apparatus includes an automatically controlled cleaning machine and coded reflective targets used to provide information to the cleaning machine for positioning it along desired cleaning paths. The apparatus determines it position on a real time basis, particularly in the case of obstacles that are encountered by the cleaning machine during its cleaning operation. Hardware and software are provided for controlling movement of the cleaning machine relative to side and end walls of the floor surface section being cleaned, as well as controlling the functions of cleaning equipment.

27 Claims, 8 Drawing Sheets

AUTOMATIC CONTROLLED CLEANING MACHINE

FIELD OF THE INVENTION

The present invention relates to floor cleaning machines and, in particular, to an operatorless cleaning apparatus that relies on target information for desired movement.

BACKGROUND OF THE INVENTION

Various apparatuses have been developed to effectively clean floors. These vary from small personal vacuum cleaners to large industrial floor scrubbers. One of the most common industrial floor cleaners requires an operator to manually direct the cleaner over the areas where the cleaning is desired. The benefits gained by such cleaners include the thoroughness of the cleaning operation, the speed at which the cleaner can clean and, since most are self-powered, the ease of maneuverability. Labor costs have led to even further advances. In particular, instead of one operator per floor cleaner, floor cleaning inventions have been disclosed that allow a single operator to control a plurality of floor cleaners. For example, there are floor cleaners that are controlled by wires embedded in the floor such that an operator may initiate a number of floor cleaners simultaneously, each following a different wire track. However, the initial expense and resulting inflexibility has motivated the development of floor cleaning apparatuses guided substantially by the combination of a computer for determining the cleaning sections and cleaning paths, and a location sensing system for providing continual feedback as to the location of the cleaner during the cleaning process. In one such apparatus, the location sensing system includes laser beam emitting and sensing equipment for reflecting a laser beam off pre-positioned reflective targets. The targets are oriented to correspond with the cleaning path configuration. Thus, for instance, the reflectors are positioned in rows on the ceiling such that the floor cleaner may traverse a path parallel to a reflector row. In another embodiment, the targets are able to emit a desired signal upon activation by the laser beam. On the other hand, such automated floor cleaners lack a general location determining system to orient themselves within a cleaning area. That is, such floor cleaners can only determine their position relative to the current path being cleaned. They also have little in the way of obstacle avoidance capabilities other than a multiplicity of sensing devices that shut the floor cleaner off when an obstacle is detected. However, it is known in the cleaning field to utilize a robotic unit that is preprogrammed to avoid predetermined obstacles that are found in the area to be cleaned. This unit is deficient though in properly handling obstacle avoidance under certain critical circumstances, including when an obstacle is encountered that was not taken into account during the pre-programming.

With respect to obstacle avoidance, a certain measure of success has been made in a different field, that of robotics. Robots have been developed which traverse a predetermined path deviating only enough to avoid obstacles in their path. One such robot, used as a sentry, navigates by infrared beacons placed at "nodes" along a path to be followed by the robot. If an obstacle is encountered on the path, the robot attempts to avoid it by the use of 24 ultrasonic sensors placed every 15° around the robot. Since the robot is shaped much like a vertical cylinder, a relatively simple algorithm is used to avoid small obstacles. That is, by determining the collections of blocked and unblocked ultrasonic sensors around the robot's circumference, a deviation angle is determined such that by changing course by this angle, the robot will avoid the obstacle.

Despite these previous efforts, no floor cleaning apparatus has effectively combined and automated the functions peculiar to floor cleaning with a sufficiently accurate general location determining system to also provide sophisticated obstacle avoidance techniques.

SUMMARY OF THE INVENTION

The present invention relates to a method and apparatus for automatically cleaning a sequence of predetermined floor sections, each floor section being identified preferably using a plurality of predetermined bar-coded reflective targets such that the cleaning of each section is completed prior to the commencement of the cleaning of another section.

More particularly, a robotic floor scrubber is disclosed that includes both navigation capabilities and floor scrubbing specific conventions not heretofore combined. The scrubber is capable of both navigating within a section it is scrubbing and between scrubbing sections. The navigation and control features for accomplishing this include a general purpose navigation unit including a laser scanner assembly for detecting the reflective bar-coded targets. By detecting these targets, the scrubber can identify each predetermined scrubbing section and determine its position within a section. Thus, wherever such targets are visible, the scrubber can navigate to either clean a section or traverse it en route to another section to be cleaned. Furthermore, for predetermined stationery objects, such as walls, the navigation and control features include procedures relating to scrubber action when adjacent to such objects. In particular, when adjacent to a wall and an obstacle is encountered, the scrubber will stop and request assistance since any attempt to turn may cause contact with the wall. Also, when scrubbing the first or last path of a scrubbing section, the scrubber is likely to be heading into a walled corner. Thus, as the corner is approached, the scrubber automatically veers gradually away from it and any adjacent wall so as to be able to safely execute a turn to reverse direction or some other appropriate direction.

In addition, the present invention also provides the capability for obstacle/hazard detection and avoidance. That is, the scrubber can detect and attempt to avoid obstacles and hazards encountered, whether or not the scrubber has been provided with predetermined information prior to encountering them. The scrubber has a plurality of sensors to assist in these tasks. The sensors allow:

(i) Objects to be detected within the scrubber's immediate surroundings, that is, objects directly in the scrubber's path, to either side and overhead.

(ii) Floor surface levelness to be detected directly in front of the scrubber. Thus, drop-offs and steps are detected.

(iii) Bumped objects to be detected.

In all three categories (i) through (iii) above, obstacle/hazard detection at least results in the scrubber stopping and signaling for assistance if nothing else can be done. With the first category of detected objects, most obstacles can be avoided. That is, in conjunction with the navigation and control features discussed above, which allow the scrubber to accurately and continually determine its position, the scrubber uses the information from object detection in (i) above to automatically avoid obstacles and continue scrubbing, varying only minimally from the pre-assigned path. The only exceptions to this, where the scrubber stops and signals for assistance, are: when the scrubber is very near or bumps an object, when the scrubber is completely blocked and unable to turn, when an overhang or substantially uneven surface is encountered, or when the scrubber is navigating between scrubbing sections.

The sensors providing the data for (i) through (iii) above, are of three types: ultrasonic, infrared, and contact switches. There are 23 horizontally directed ultrasonic sensors on the scrubber for front and lateral obstacle detection. In addition, there are two front ultrasonic overhang sensors. Further, there is a front-located infrared transmitter and a receiver for detecting floor levelness. Finally, there are bumper switches surrounding substantial portions of the scrubber as a means to detect object bumps.

It is the purpose of this invention to automate the scrubbing process as well. That is, the floor scrubbing specific functional units of the scrubber are automatically activated and deactivated so as to synchronize with the navigation and control features during scrubber operation. These units include a floor scrubbing assembly having, for example, two rotatable scrub brushes for scrubbing the floor, a solution dispensing unit for providing scrubbing solution to the scrubbing assembly, and a solution recovery unit having a squeegee and a vacuum motor for recovering excess solution used in the scrubbing process. Thus, the floor scrubbing unit is activated by lowering the brushes to the floor and causing them to rotate, the solution dispensing unit is activated by allowing solution to flow to the scrubbing unit and the solution recovery unit is activated by lowering the squeegee and switching on the vacuum motor. Specifically, when the scrubber commences scrubbing an area, or whenever an obstacle either is successfully avoided or is removed, the scrubber automatically activates all three scrubbing functional units. Alternatively, whenever the scrubber is blocked or not following its scrubbing pattern, (e.g., in avoiding an obstacle) these scrubbing functional units are automatically deactivated. Further, during predetermined turns, requiring substantially a reversal in scrubbing direction, the scrubber deactivates the solution dispensing unit approximately 5 feet prior to the turn, thus avoiding scrubbing solution saturation in turning areas. Also, to avoid excessive floor surface wear, the floor scrubbing assembly is deactivated during such turns.

Thus, the present invention provides a substantially automatic floor scrubber which integrates a sophisticated robotic navigation means with automated floor scrubbing functions to provide both a substantial reduction in the personnel required to participate in the floor scrubbing process and a thorough floor scrubbing operation without excessive wear. Other features and benefits of the present invention will become apparent from the detailed description and the accompanying figures contained hereinafter.

DETAILED DESCRIPTION

Figure 1:
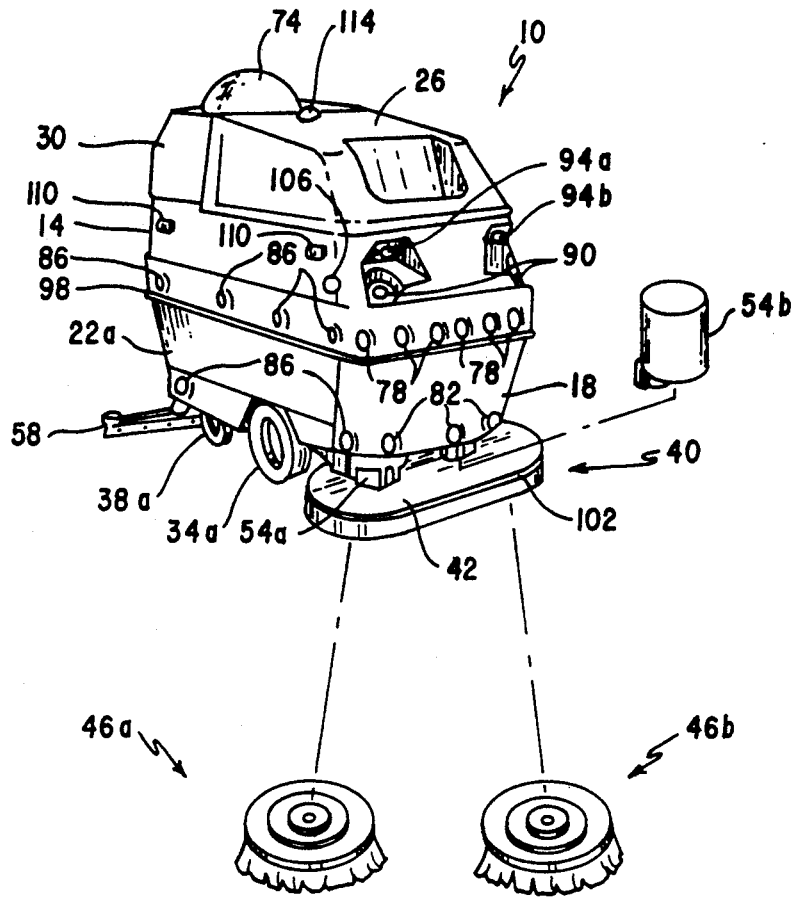
FIG. 1 is an external oblique front view of the scrubber.
Figure 2:
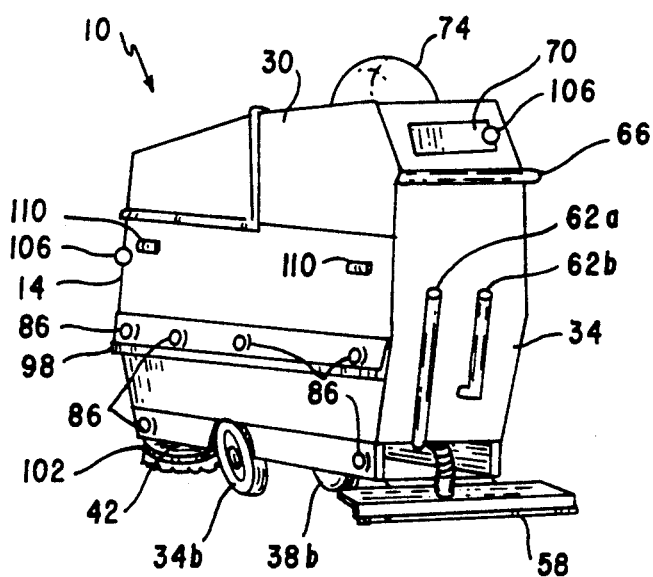
FIG. 2 is an external oblique rear view of the scrubber.

Referring to FIGS. 1 and 2, the exterior of an automated scrubber 10 of the present invention is shown. The scrubber 10 includes a housing 14 that is generally a box-like enclosure having a front panel 18, two side panels 22a and 22b, a hood 26, an electronic control compartment 30, and a back panel 34. The housing 14 encloses substantially all of the electronic components of the scrubber 10 as well as a large portion of the scrubbing components and the entire battery pack used to power the scrubber 10. Supporting the housing 14 and its contents are two drive wheels 34a and 34b, and two rear support wheels 38a and 38b. The drive wheels 34a and 34b provide the locomotion for the scrubber 10.

Immediately in front of the drive wheels 34 is the scrubbing assembly 40. It includes the scrub deck 42 which provides the physical floor scrubbing apparatus consisting of two rotational brush assemblies 46a and 46b, each containing a circular brush. The scrubbing unit 40 also includes two brush motors 54a and 54b which, respectively, cause the brush assemblies 46a and 46b to rotate. As the brush assemblies 46 rotate, cleaning solution is dispensed by the scrub deck 42 in a manner discussed below. The dirty solution left behind after scrubbing is recovered from the floor by a squeegee assembly 58 trailing the housing 14 at the floor level and projecting laterally beyond both sides of the housing 14. Immediately above the squeegee assembly 58 are the drain tubes 62. Each tube is connected to a solution storage tank as is discussed below. When the upper end of either tube is lowered, the cleaning solution stored in the connected tanks can be drained.

Above the drain tubes 62 in the uppermost corner is the manual drive handle 66 and the control panel 70. The manual drive handle 66 allows an operator to manually steer the scrubber 10. As will be discussed below, the control panel 70 provides an operator with control over substantially all of the capabilities of the scrubber 10. For example, the operator can specify, via the control panel 70, whether to run the scrubber in "manual mode" such that the operator explicitly controls the scrubber 10, or in "automatic mode" where the scrubber 10 automatically navigates through a predetermined cleaning section deviating only to avoid obstacles.

Above the control panel 70, resting on top of the control compartment 30 is an infrared laser scanner assembly 74. This assembly emits a light beam and detects the reflected light from surrounding targets. Used in automatic mode, the scanner assembly 74 provides information to assist the scrubber 10 in navigating itself within a cleaning area. In particular, the laser scanner assembly 74 emits a light beam that is reflected using a collection of predetermined bar-coded reflective targets (shown schematically in FIG. 6). These targets enable the scrubber 10 to determine its position and the identity of the cleaning area.

In addition to the scanner laser assembly 74, the scrubber 10 has a plurality of ultrasonic and infrared sensors. In one embodiment, there are eight ultrasonic sensors 78 traversing the upper front panel 18. In automatic mode, these sensors detect obstacles that limit or impede the forward direction of travel of the scrubber 10. Obstacles, either relatively stationary such as palette stacks or non-stationary, such as personnel, are taken into account at a range of about six feet. Also directed forwardly are three ultrasonic lower front panel sensors 82 for detecting low-lying obstacles. These sensors 82 are positioned just above the bottom edge of the front panel 18. In addition, there are twelve ultrasonic side panel sensors 86 that emit signals laterally or in a direction substantially perpendicular to the length of the scrubber 10. Of these twelve, six ultrasonic sensors 86 reside on each side of the scrubber 10. These sensors provide object detection to assure that the scrubber 10 does not hit or get too close to an object when turning or at any other time. Further, there are two upwardly and forwardly directed ultrasonic overhang sensors 90 recessed into the front assembly 18. The overhang sensors 90 detect obstacles that have a presence in front of the scrubber 10 and are at a height greater than what the sensors 78 and 82 can detect. Specifically, the overhang sensors 90 are angled at 15° off vertical so as to detect obstacles immediately overhead. The overhang sensors 90 are particularly useful in detecting overhanging obstacles that might otherwise go undetected causing the scrubber 10 to hit an overhang. Each sensor generates the same signal when at least one of them detects an obstacle. In all, there are 25 such ultrasonic sensors, each is identical and each senses objects independently of the other sensors.

There is also an infrared drop-off avoidance transmitter and receiver combination 94. Drop-off avoidance transmitter 94a emits an infrared beam directed downwardly and forwardly of the scrubber 10. If the floor in front of the scrubber 10 is close to level with the floor underneath the scrubber 10, then the infrared beam will reflect off the floor about 40 inches in front of the scrubber and will be detected by the drop-off avoidance receiver 94b. If, on the other hand, the floor in front of the scrubber 10 either drops or rises more than about 94b and therefore a floor-height hazard can be detected.

The scrubber 10 also includes various safety features beyond those supplied by the various sensors discussed above. Traversing both side panel assemblies 22 and the front panel 18 is a bumper switch 98. Used in automatic mode, this switch is pressure-sensitive, emitting electrical signals only when contacted or bumped. Thus, since the switch 98 follows the contour of the housing 14 at its widest and longest dimensions, if the housing 14 bumps an object, it will likely be on the bumper switch 98. Thus, the signal emitted by the bumper switch 98 allows the scrubber 10 to take proper action. There is also a second bumper switch 102 that traverses the perimeter of the scrub deck 42. This sensor provides the same function for the scrub deck 42 that the bumper switch 98 does for the housing 14. In addition, there are three emergency stop buttons 106 located about the housing 14, such that if activated, the scrubber 10 immediately stops and shuts off power to discontinue scrubbing functions. Finally, there are running lights 110 and at least one help beacon 114. While the scrubber 10 is in automatic mode, the running lights 110 serve to signal personnel of the location of the scrubber 10. The help beacon 114 provides the scrubber 10, while in automatic mode, with the capability to visually alert an operator when assistance is required.

Figure 3:
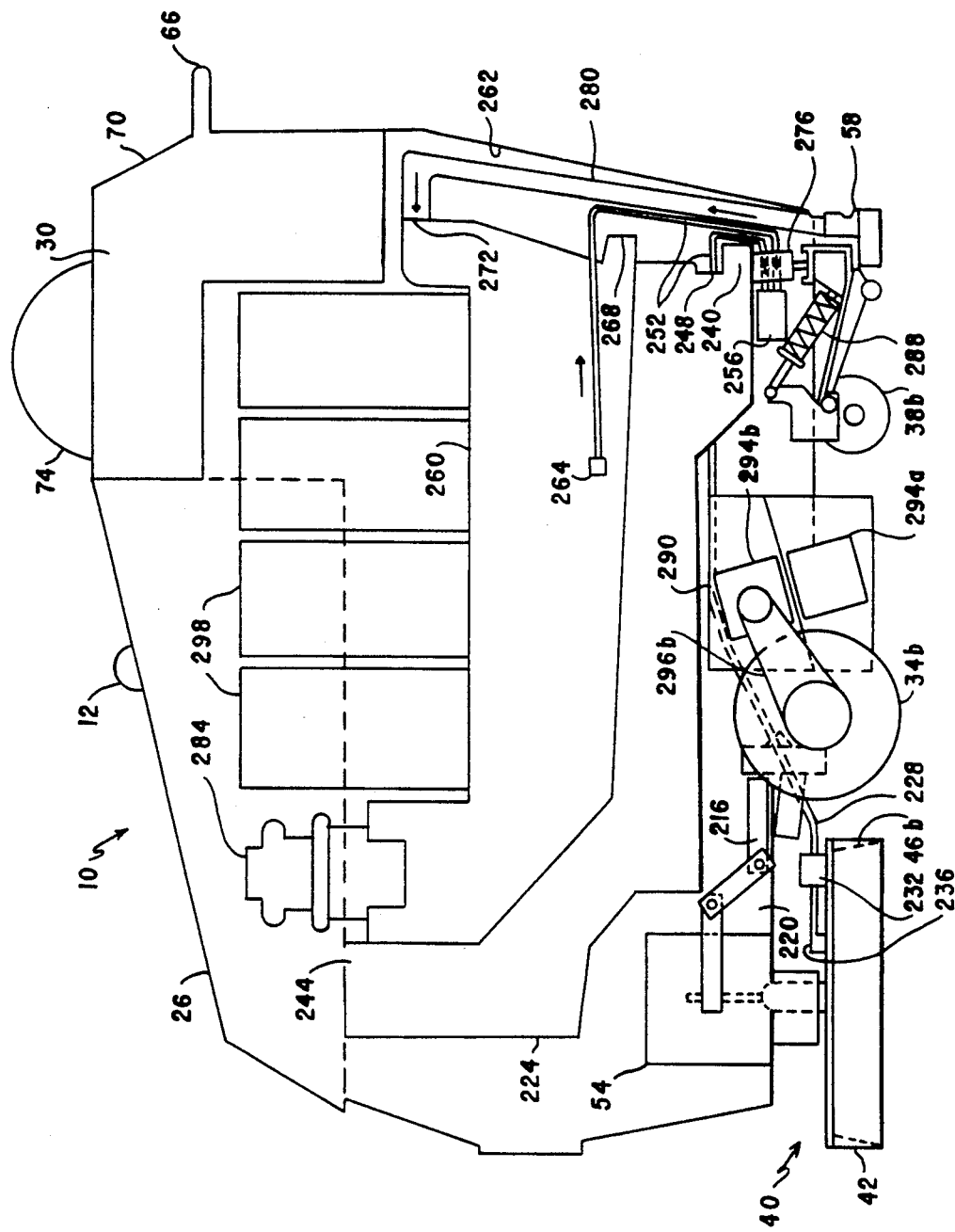
FIG. 3 is a cross-sectional view of the scrubber.

Referring now to FIG. 3, the internal assemblies of the scrubber 10 are disclosed. The scrubbing assembly 40 also includes a scrub deck actuator 216 which is used to raise and lower the scrub deck 42. In automatic mode, the scrubber 10 will raise the scrub deck 42 at various points during a cleaning session. In manual mode, a control panel 70 switch allows an operator to raise or lower the scrub deck 42 as well as turn the brush motors 54 on and off. Also connected to the scrub deck 42 is the solution dispensing unit 220. Cleaning solution drains from the solution tank 224 through a first conduit 228 of the assembly 220 and passes through the solution shut-off solenoid 232 which controls the solution flow to the scrub deck 42. Subsequently, the solution flows to the scrub deck 42 via conduit 236. In addition, the solution tank 224 also has a drain outlet 240 for draining all solution from the tank. Note that this drain is attached to the drain tube 62a. The solution tank 224 also has two openings to allow solution into the tank, the opening 244 sheltered by hood 26 is the inlet for filling the solution tank with fresh solution. A solution recycling inlet 248 is attached to the back of the solution tank 224. This inlet allows solution recovered from the scrubbing process to be recycled. The recycled solution is provided to the solution tank 224 via a series of conduits 252 and a pump 256. This pump acts to deliver recovered solution stored in the recovery tank 260 into the solution tank 224. There are various filters and strainers, such as filter 264, attached to the conduits 252 to insure proper solution cleansing prior to the recycled solution entering the solution tank 224. In addition to the outlet for conduit 252 in recovery tank 260, there is an outlet 268 for draining the tank. This outlet is attached to drain tube 62b (shown in FIG. 2). Also in the rear of the recovery tank 260 is the solution inlet 272 for allowing solution recovered after the scrubbing process to enter the recovery tank 260. The used solution is urged into the recovery tank 260 by the solution recovery unit 262. This unit includes the squeegee assembly 58, a squeegee actuator motor 276 for raising and lowering the squeegee assembly 58 to/from the floor, the tubing 280 for conveying the used solution to the recover tank 260 and a vacuum motor 284 for creating a vacuum within the recovery tank 260 which supplies the impetus for the used solution to enter the recovery tank 260. Thus, once the squeegee assembly 58 is lowered, and biased against the floor by the spring 288, the suction induced by the vacuum motor 284 causes any excess solution to be deposited in the recovery tank 260.

FIG. 3 also discloses a drive assembly 290 containing two drive motor assemblies 294a and 294b. The first drive motor assembly 294a drives wheel 34a via the belt 296a (not shown), while the second drive motor assembly 294b drives the wheel 34b via a belt 296b. For the scrubber 10 to turn, the rotation of the drive motor assemblies 294 and their associated wheels are controlled in a predetermined manner With regard to wheel control in turning the scrubber 10, three general categories of control can be defined. In a first mode, both wheels 34 are rotating, either at the same rate or a different rate, in the same direction. This first mode is useful in achieving, for example, a wide turn or a gradual veering of the scrubber 10. In a second mode, one of the wheels does not rotate, while the other wheel does rotate. This mode is useful in achieving a turn at the end of one scrubbing path so that the next adjacent scrubbing path can be cleaned. In a third mode, the two wheels rotate counter to each other. This mode is useful in causing a turn that is narrower than the body of the scrubber 10. This mode may be implemented, for example, when it is desirable to have the scrubber 10 finish its cleaning operations at the same end of the floor and where the floor dimensions are such to require relatively great overlap of cleaning paths. The third mode is also useful in avoiding obstacles whereby the wheels are counterrotated substantially at the same rotational velocity so that the scrubber 10 maintains a position substantially within its own dimension or dimensions. These capabilities allow the scrubber 10 to turn in a controlled radius manner through any angle desired. In manual mode, such turns are done by the steering of an operator via the manual drive handle 66. In automatic mode, a processor and related control circuitry within the control compartment 30 controls the turning process as will be discussed below. Because the scrubber 10 is preferably battery-powered, a plurality of batteries 298 reside immediately above the recovery tank 260 to power the scrubber 10.

Figure 4:
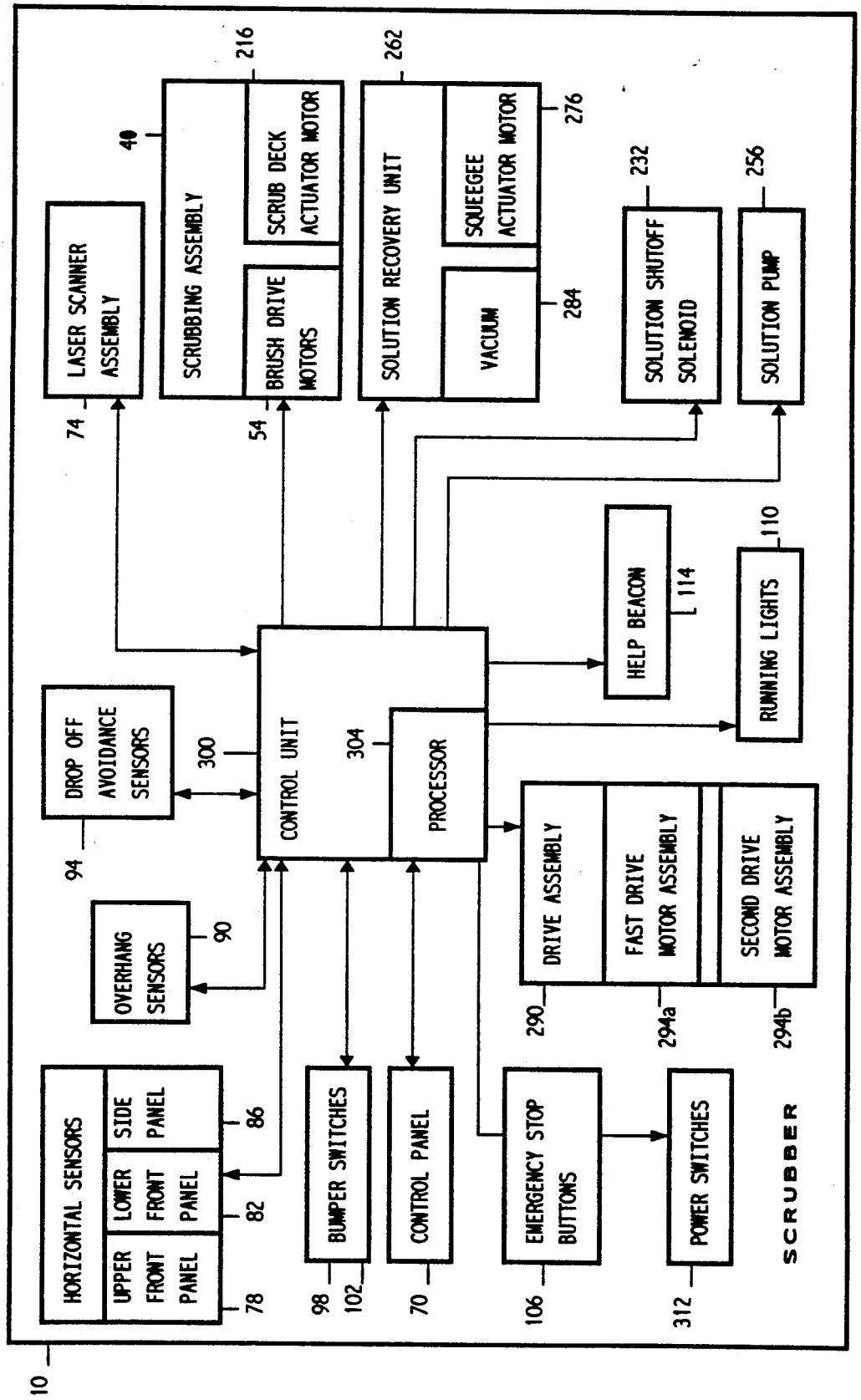
FIG. 4 is a block diagram of the electrical components of the scrubber.

Referring now to FIG. 4, a block diagram of the automated scrubber 10 is shown that includes its main components. Lines with arrows between the components represent the primary data and control flow paths. Starting with control unit 300, this component is contained in the control compartment 30. The control unit 300 provides the scrubber 10 with all the automatic decision and navigational capabilities via the programmable processor 304. In addition, the control unit 300 also stores navigation maps identifying the sections to be cleaned and the pathways linking such sections. Note that all control signals are either routed through the control unit 300 or emanate directly from the processor 304. The connection from the control unit 300 to the drive assembly 290 provides the signals for designating the rates at which the motors within the motor assemblies 294 are to be driven in order to achieve desired control of the drive wheels 34a, 34b. In this manner the control unit 300 determines the direction and speed of the scrubber 10. The feedback from the drive assembly 290 to the control unit 300 includes signals indicating the number of revolutions of each wheel 34. Each motor assembly 294 includes a motor encoder which transmits this information to the control unit 300 and, in particular, to the processor 304 as will be discussed with reference to FIGS. 5 and 6 below.

The connections from the control unit 300 to each of the following: the running lights 110, the help beacon 114, the solution pump 256 and the solution shut-off solenoid 232 transmit activation and deactivation signal to these components. The connection from the control unit 300 to the solution recover unit 262 allows the scrubber 10 to recover excess solution remaining on the floor after the scrubbing process. The vacuum motor 284 and the squeegee actuator motor 276 act in concert to reclaim any excess solution on the floor. The control unit 300 activates and deactivates these two components together, except after the squeegee assembly 58 is raised from the floor surface after scrubbing since the vacuum motor 284 remains powered on to remove fluid from the hose of the squeegee assembly. Similarly, the scrubbing assembly 40 includes electrical components whose activation and deactivation must be coordinated. That is, to activate the scrubbing assembly 40, the scrub-deck actuator motor 216 first lowers the scrub deck 42, then the brush drive motors 54 are activated. The electrical connection between the control unit 300 and the laser scanner assembly 74 allows for the activation and deactivation of an infrared laser used in scanning the bar-coded reflective targets identifying cleaning section locations Data regarding the position of these targets is transmitted back to the control unit 300. This data, in conjunction with the stored navigation maps, allows the processor 304 to determine the position and orientation of the scrubber 10. The signals received from the drop-off avoidance transmitter/receiver 94 by the control unit 300 indicate the amount of the infrared beam that is sensed by drop-off avoidance receiver 94b. This provides a reliable indicator as to the levelness of the floor in front of the scrubber 10. The connections from the control unit 300 to each of the ultrasonic sensors 78-90 provide for activation and deactivation of all 25 ultrasonic sensors 78-90 simultaneously. The feedback from each ultrasonic sensor to the control unit 300 includes data relating to the distance of the nearest object detected within a conical region expanding out from the sensor. It should be noted that since these sensors are used for obstacle detection and avoidance, they need only detect objects relatively close to the scrubber 10. In the current embodiment, this range is approximately six feet. The three sets of horizontal ultrasonic sensors 78, 82, 86 provide the obstacle avoidance sensing capabilities for those obstacles that can be detected at a height of less than approximately four feet from the floor. The overhang ultrasonic sensors 90 provide only obstacle detection capabilities for higher obstacles not detected by the horizontal ultrasonic sensors. Communication between the control unit 300 and the bumper switches 98 and 102 allow for activation and deactivation of the bumper switches. Signals generated by a bumper switch when contacted are transmitted to the control unit 300.

The connections between the control unit 300 and the control panel 70 provide substantially all of the interaction between an operator and the scrubber 10. The operator can:

(i) switch power on/off to the scrubber 10;

(ii) place the scrubber 10 in either manual or automatic mode. In manual mode, the operator explicitly controls, via the control panel 70 and the manual drive handle 66, the steering of the scrubber 10, the speed of the scrubber 10, the scrubbing unit 40, the solution recovery unit 262 and the solution shut-off solenoid 232. Note in automatic mode, all these functions are automatically controlled;

(iii) stop the scrubber 10 from further scrubbing and movement; and (iv) designate, in automatic mode, whether or not the scrubber 10 should, when finished scrubbing one area, automatically proceed to the next area to be scrubbed.

Conversely, the control unit 300 transmits scrubber 10 status information to the control panel 70 regarding each of the controls described in (ii) to (iv) above. Further, a substantial number of scrubber 10 component malfunction errors are transmitted to the control panel 70 where they are pictorially represented.

The connection from the emergency stop buttons 106 to the control unit 300 informs the processor 304 that all scrubber 10 functions have been shut down due to an emergency stop button being activated. The actual power shut-off signal from an emergency stop button 106 to all scrubber 10 components is controlled for application to each component via a collection of power switches 312.

OPERATION

Figure 5A:
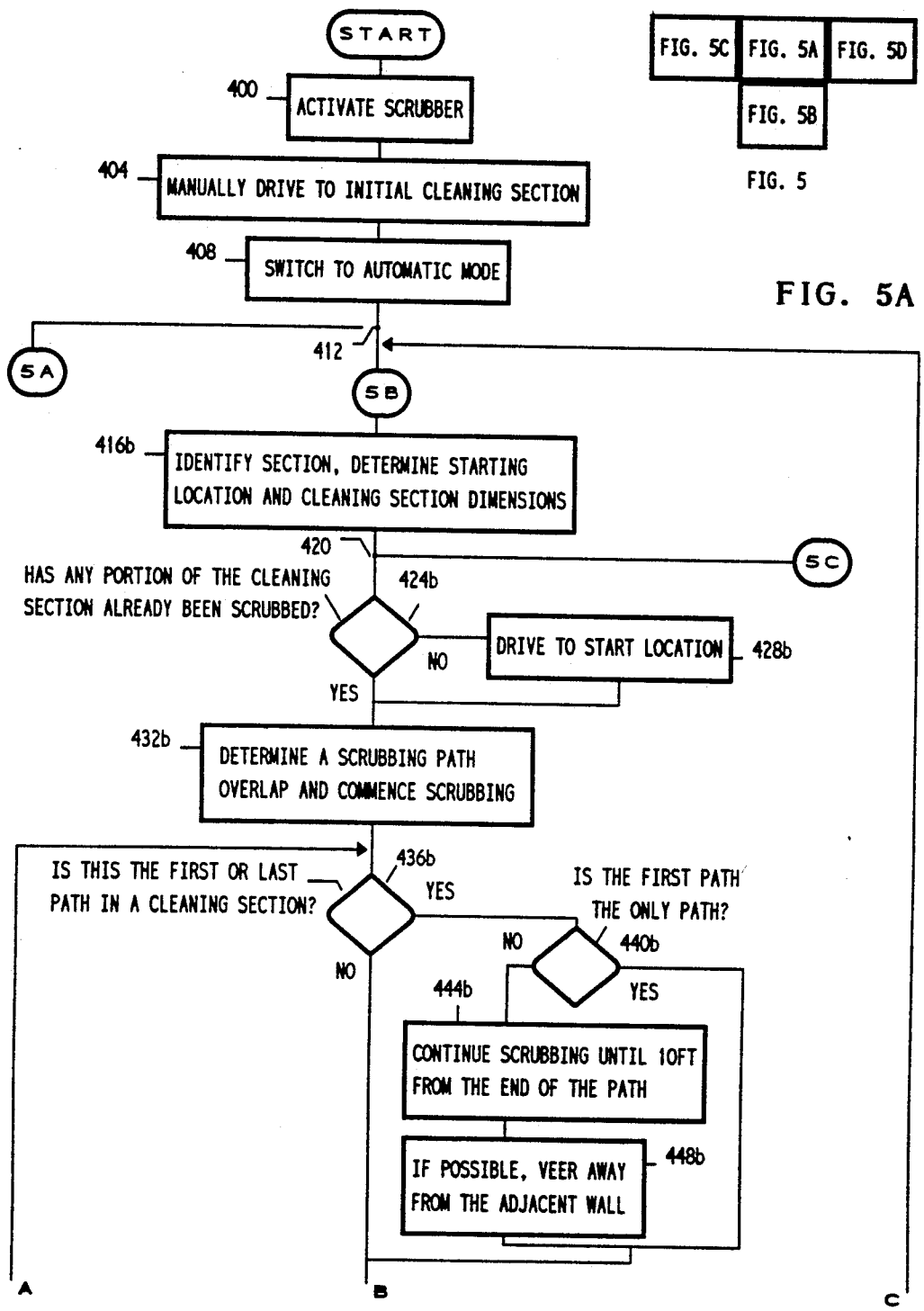
FIGS. 5-5D relate to flowcharts describing the operation of the scrubber.
Figure 5B:
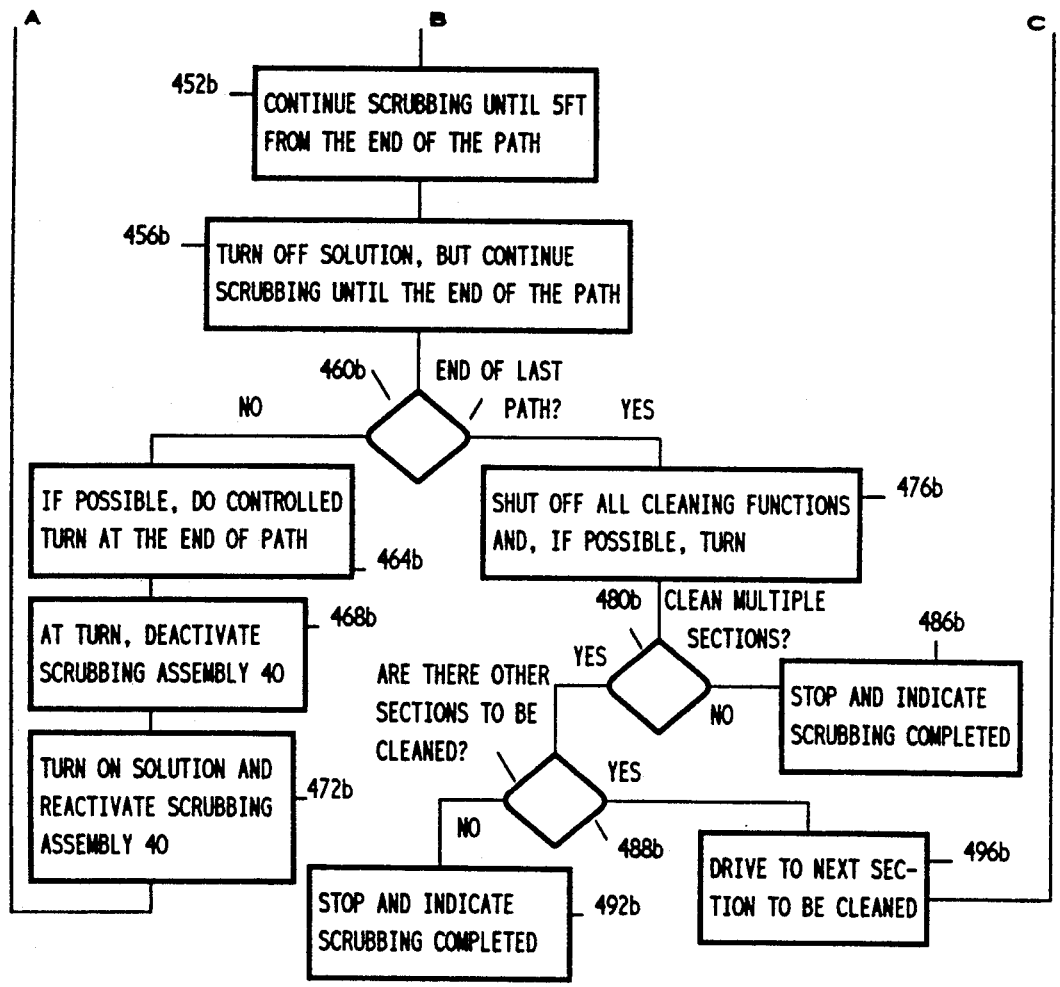
Figure 5C:
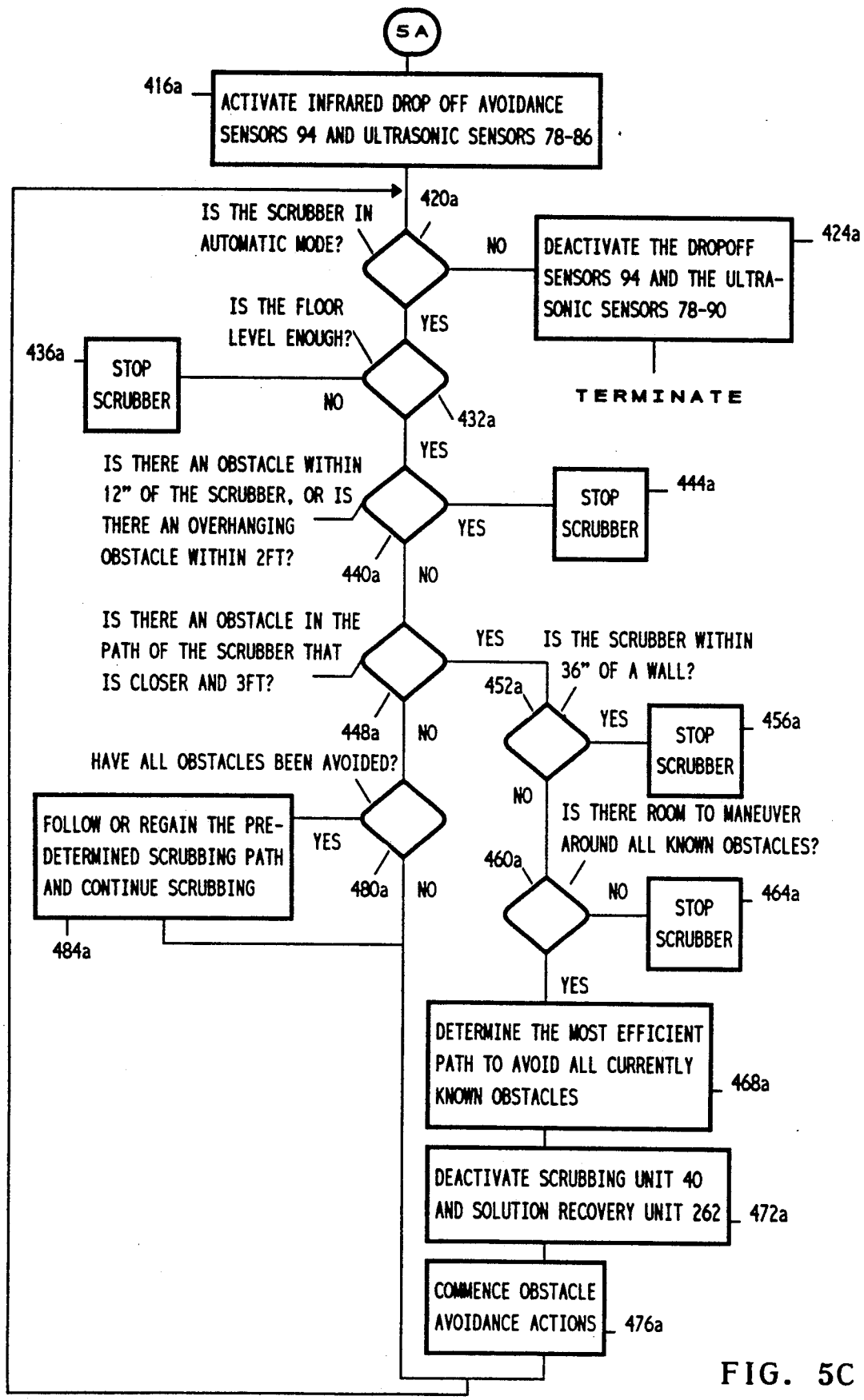
Figure 5D:
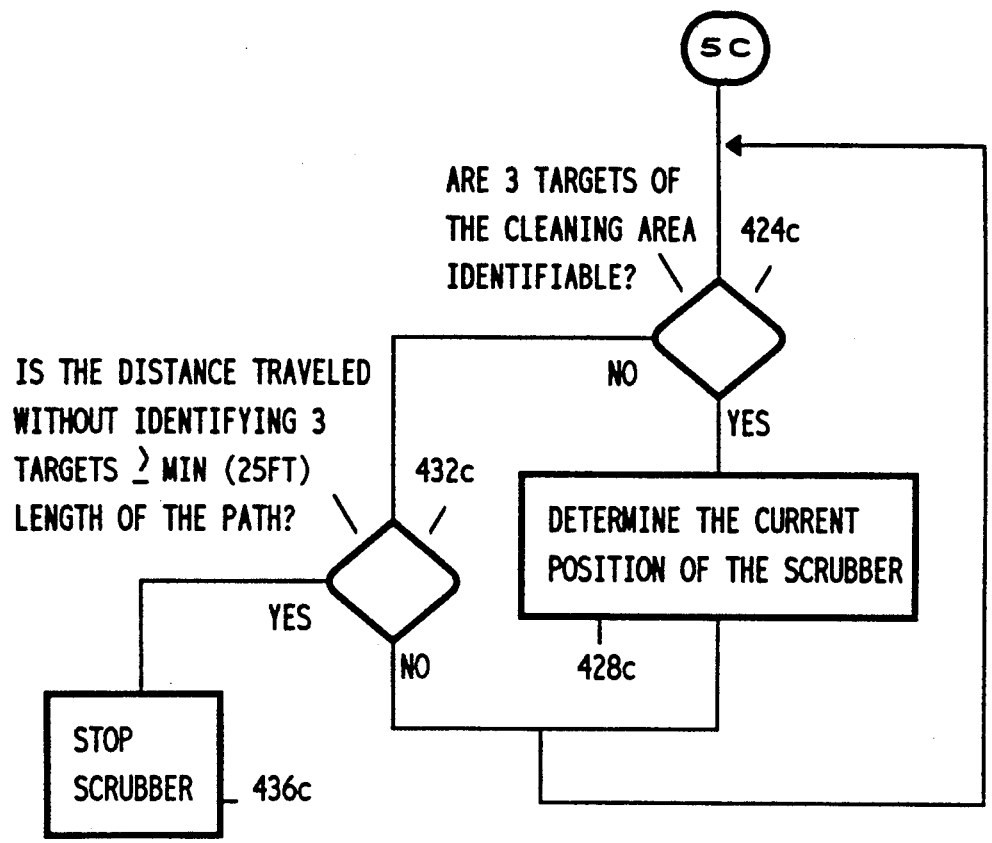
Figure 6:
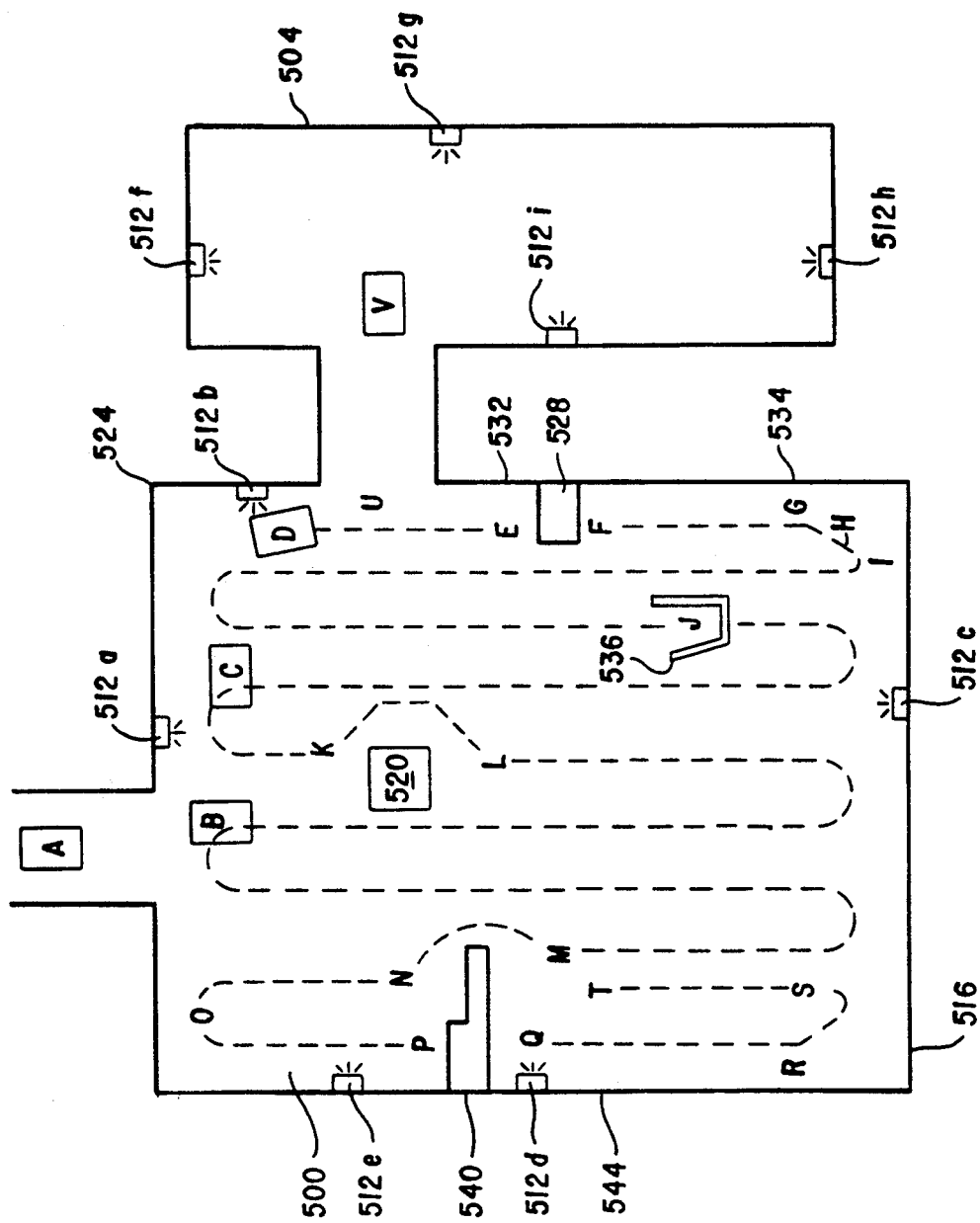
FIG. 6 is a diagram illustrating the operation of the scrubber with regard to two connected scrubbing areas.

To describe the operation of the scrubber, FIGS. 5-5D and 6 are referenced. FIG. 5 is a key to FIGS. 5A-5D, which depict a high level flow charts of the scrubber 10 operation in automatic mode, while FIG. 6 demonstrates the actions associated with the scrubber during a cleaning session. Referring to FIG. 6, there are two rectangular sections 500 and 504 to be cleaned, section 500 identified by targets 512a-512e and section 504 identified by targets 512f-512i. The scrubber 10 is assumed to be initially charging at the battery charging location at position A. In step 400 of FIG. 5-5A, an operator activates the scrubber 10, via the control panel 70. This activates the control unit 300 so that further operator instructions can be executed. In addition, the laser scanner assembly 74 is automatically activated and commences to scan the section for bar-coded reflective targets. In step 404, the operator manually drives the scrubber 10 to the initial cleaning section 500 of FIG. 6. Assuming the scrubber 10 is driven from position A to position B, in step 408, if the operator switches the scrubber 10 to automatic mode, the processor 304 responds, at point 412 (FIG. 5), by generating two concurrent processes 5A and 5B. The process 5A activates the drop off avoidance transmitter/receiver 94, the ultrasonic sensors 78-90 and subsequently, initiates any necessary obstacle detection and avoidance actions, while process 5B proceeds with the preprogrammed cleaning plan. Thus, in step 416a of process 5A, the infrared drop off avoidance transmitter/receiver 94 and the ultrasonic sensors 78-90 are activated. Subsequently, decision step 420a is encountered to determine if the scrubber 10 is still in automatic mode. If not, then in step 424a, both the drop off avoidance transmitter/receiver 94 and the ultrasonic sensors 78-90 are deactivated and the process 5A terminates. Conversely, if the scrubber 10 is in automatic mode at step 420a, then the remainder of the steps of process 5A constitute a loop that monitors and responds to drop offs and obstacles as will be discussed below.

Continuing with process 5B, in step 416b, the scrubber 10 attempts to both identify the section 500 and calibrate its position and orientation within this area. This is done by having the laser scanner assembly 74 scan the section 500 for four reflective targets 512. These targets supply the scrubber 10 with both the identity of the section 500 as well as a means to triangulate its position within section 500. In addition, once the section identity is known, processor 304 uses the data navigation map stored in the control unit 300 to determine the section dimensions and the start location where cleaning should commence. At position B, the laser scanner assembly 74 can only see the targets 512a, 512b and 512e. Thus, the scrubber 10 alerts the operator, via the control panel 70 and the help beacon 114, that an insufficient number of targets are visible for the scrubber to proceed. The operator must either unblock some of the targets or move the scrubber 10 to another position. If the operator switches the scrubber 10 to manual mode and manually drives the scrubber 10 to position C where the targets 512a, 512b, 512c and 512e are visible and once again switches the scrubber 10 to automatic mode, then the processor 304 now identifies the section 500 and the position of the scrubber 10 within this section. Subsequently, the processor 304 accesses the onboard navigation map data and retrieves the dimensions of the section 500 and the start location, which for section 500 is position D. At point 420, process 5C is generated to execute concurrently with processes 5A and 5B on processor 304. Process 5C continually accepts input data from the laser scanner assembly 74 and triangulates the position of the scrubber 10. Thus, in step 424c, a determination is made as to whether there are three identifiable targets from the current cleaning section. If so, then in step 428c, the position of the scrubber 10 is triangulated from the angles of the three targets identified in step 424c and subsequently 424c is again encountered. Alternatively, if three targets cannot be identified, then in step 432c, a determination is made as to whether the distance travelled without identifying three targets in automatic mode is greater than about 25 feet. If so, then the processor 304 stops, deactivates both the scrubbing assembly 40, the solution dispensing unit 220 (i.e., shuts solution flow via solenoid 232) and the solution recovery unit 262, and alerts the operator that assistance is required. Otherwise, if the scrubber 10 is either not in automatic mode, or has not traveled the predetermined distance blindly, then once again step 424c is encountered.

Continuing with process 5B, the decision step 424b is encountered. In this step, the processor 304 determines whether or not any portion of the current section has been scrubbed. Since none of the section 500 has been scrubbed, the processor 304 automatically drives the scrubber 10 to position D as step 428b indicates. At position D, as step 432b indicates, the scrubber 10 automatically computes a constant scrubbing path overlap for a forward and back scrubbing pattern of section 500 such that no single path is substantially scrubbed twice and subsequently commences scrubbing. That is, using predetermined data and data determined using the targets, such as the surface area of the area to be cleaned, the dimensions of the floor scrubbing housing 14 and the longitudinal extents of the brush assemblies 46 and/or the squeegee assembly 58, the processor 304 calculates a value relating to the magnitude that the scrubber 10 is to be incremented in a lateral direction relative to the longitudinal scrubbing path. Commonly, because the surface area to be cleaned is not divisible into scrubbing paths for which there is no overlap of the scrubbing function, the calculation results in a relatively short strip of the surface area that is again subject to the cleaning operation. This relatively short longitudinally extending strip may vary from fractions of an inch to a few inches, depending upon at least some of the aforestated factors. The processor 304 thereafter activates the scrubbing assembly 40, the solution dispensing unit 220, the solution recovery unit 262 and proceeds to scrub along the dashed line parallel to the wall 532 always staying at least 12 inches from wall 532. In decision step 436b, the processor 304 determines, using target data to determine x,y information, that the path most adjacent to a boundary or wall in the section is presently being scrubbed. The turns at the end of this path, as well as a last scrubbing path for the section, require that the scrubber 10 veer away from the boundary or wall as will be discussed below. In the next step, step 440b, a determination is made as to whether there is only on scrubbing path in the cleaning section, for instance, whether the section 500 is a narrow hallway. Since this is not the case, step 444b is next encountered. This step results in the processor 304 continually monitoring the position of the scrubber 10 until a position 10 feet from the end of a scrubbing path is reached as will be discussed below. Of course, as the scrubber 10 progresses, process 5A is continually checking for obstacles and drop-offs and, in addition, process 5C is continually attempting to triangulate the position of the scrubber 10.

When the scrubber 10 reaches position E, the ultrasonic sensors 78 and 86 determine that the obstacle 528 is in the scrubbing path. This determination is made in process 5A with the steps beginning at decision step 420a. Since the scrubber 10 is in automatic mode during step 420a, decision step 432a is next encountered. In this step, a determination is made, based on the most recent data output by the drop-off avoidance sensors 94, as to whether the floor is sufficiently level to allow the scrubber 10 to proceed. If not, then in step 436a, the scrubber 10 stops, deactivates the scrubbing assembly 40, the solution dispensing unit 220 and the solution recovery unit 262, and alerts the operator that assistance is required. Assuming this has not occurred, the next step encountered is decision step 440a which uses the output data from all ultrasonic sensors 308 to determine if there is an object within 12 inches of the front or sides of the scrubber 10. If so, then in step 444a, the scrubber 10 again stops, deactivates the scrubbing assembly 40, the solution dispensing unit 220 and the solution recovery unit 262, and alerts the operator that assistance is required. Assuming this also has not occurred, step 448a is encountered. In this step a determination is made as to whether there is an obstacle in the path of the scrubber 10 that is closer than 3 feet from the scrubber. At position E of FIG. 6, this is the case. Therefore, decision step 452a is next encountered. In this step, a determination is made as to whether the scrubber 10 is within 36 inches of a wall. The processor 304 makes this determination by retrieving the position of the scrubber 10 as determined by the process 5C and consulting the navigation map data stored on board the scrubber 10. At position E, the determination is positive. Thus, since the scrubber 10 has insufficient lateral space to turn in accordance with the necessary controlled radius and navigate around obstacle 528, the scrubber 10 stops and deactivates the scrubbing assembly 40, the solution dispensing unit 220 and solution recovery unit 262, and alerts the operator that the situation requires assistance as step 456a indicates. As an alternative embodiment, the detection of the wall can be determined with the ultrasonic sensors 86.

From position E the operator can either remove the obstacle 528, in which case the scrubber 10 will automatically continue scrubbing, or the operator can chose to put the scrubber 10 in manual mode and steer it clear of the obstacle. Assuming the operator does the latter and thus drives the scrubber 10 to position F, the scrubber 10 can again be placed in automatic mode to continue scrubbing. However, switching to automatic mode again causes the scrubber 10 to re-execute the steps of FIG. 5 starting at step 408. Thus, among other things, the scrubber 10 checks to determine whether it is located within the section 500. If the scrubber 10 determines that it is not within the section 500, it stops all its functions. As before, four targets 512 must be visible at position F. Assuming targets 512a, 512e, 512d and 512c are visible, the scrubber 10 then determines in step 424b that a portion of the section 500 has already been cleaned. Thus, in step 432b, the scrubber 10 uses the coordinates of position F to compute a new scrubbing path overlap such that no single path is substantially scrubbed twice and then continues scrubbing from position F along a path substantially parallel to the original path. Thus, the scrubber 10 will proceed scrubbing along the dashed path to position G.

As mentioned above, the scrubber 10 continually attempts to triangulate its position from the targets 512 via process 5C. Due to the obstacle 536, this is not possible for the entire path between positions F and G. Assuming the distance where triangulation is not possible is less than about 25 feet, the scrubber 10 continues scrubbing relying on feedback from the drive motor assemblies 294 to the processor 304 to maintain a straight path. Alternatively, if the distance were greater than this minimum distance, then the scrubber will stop after traveling the minimum distance, deactivate the scrubbing assembly 40, the solution dispensing unit 220 and the solution recovery unit 262, and alert the operator that assistance is required. In this latter case, if the operator moves the obstacle 536 such that at least three targets are visible to the scrubber 10, then it will automatically triangulate its position and re-commence scrubbing.

When the scrubber 10 reaches position G, it is 10 feet from the end of the path. Thus, the step 444b of process 5B is satisfied and step 448b is next executed. In this step, the scrubber 10 changes direction such that it gradually veers away from the wall 534 so as to clear the wall 534 in its first turn at position I. In step 452b, the processor 304 monitors the position of the scrubber 10 until the scrubber reaches position H at five feet from the end of the path. At this point, step 456b is executed and the processor 304 signals the solenoid 232 to shut off the flow of solution to the scrub deck 42. This allows the solution within the brush assemblies 46 to be substantially depleted of solution by the time the pirouette at position I is executed. It is advantageous to have very little solution dispensed during turns at the ends of each path, since the speed of the scrubber 10 is slowed down in such turns and thus less floor area is covered. Note that the scrubber 10 preferably determines its distance from the end of a scrubbing path by relying entirely on determining its position via triangulation and drive motor assembly 294 feedback.

In decision step 460b, the processor 304 determines that the current path is not the last path. Thus, in step 464b, the processor 304 determines if a controlled turn is possible at the end of the path at position I and if possible then such a turn is executed. It should be noted that circumstances can arise where a proper turn cannot be executed. For example, if an obstacle blocks the path of the scrubber 10 such that obstacle avoidance is not possible. In this case, the scrubber 10 halts as at position E above. Assuming no obstacles are encountered, the scrubber 10 commences a turn at position I and simultaneously step 468b is executed. In this step, the processor 304 deactivates the scrubbing assembly 40. These actions prevent excessive burnishing of the floor surface since not only does the scrubber 10 move slower, but also much of the floor area is driven over twice in such turns. Once the turn is complete, in step 472b, all three of the cleaning functional units are once again automatically activated and the scrubbing process continues. Thus, the processor 304 branches back to step 436b of process 5B and subsequently re-executes the steps through step 472b on each scrubbing path. In this manner, the scrubber 10 scrubs back and forth overlapping the scrubbing paths by the amount as determined at position F and following the illustrated dashed line while turning off the solution flow at five feet from the end of each path and deactivating the scrubbing assembly 40 during the turns.

Whenever obstacles are encountered, these movements are modified by process 5A. For example, when the scrubber 10 encounters the obstacle 536 at position J, the processor 304 determines in step 448a of process 5A that the obstacle 536 is blocking the scrubbing path. In step 452a, the processor 304 determines that the scrubber 10 is not within 36 inches of the wall. Thus, in step 460a, the scrubber 10 determines whether the obstacle 536 can be avoided. Given the shape of the obstacle 536, no series of 45°, 90°, 135° turns can be safely executed to circumvent the obstacle. Thus, in step 460a, the processor 304 stops the scrubber 10, deactivates the scrubbing assembly 40, the solution dispensing unit 220 and the solution recovery unit 262, and alerts the operator that assistance is required. Assuming the operator removes the obstacle 536, the scrubber 10 automatically continues, reactivating these functional units.

At position K, the scrubber 10 detects obstacle 520. As before, this results in the processor 304 following the execution path that includes the steps 448a, 452a and 460a. However, in step 460a, the processor 304 determines, via the output from the ultrasonic sensors 78, 82 that there is room to maneuver around the obstacle 520. Thus, in step 468a, the processor 304 determines the most efficient path to avoid the obstacle 520. This is, in part, determined by considering both which ultrasonic sensors 78, 82 detect an obstacle and the order in which these sensors detect the obstacle. With regard to the obstacle 520, the processor 304 determines that a left controlled turn avoids the obstacle. Thus, in step 472a, the processor 304 deactivates the scrubbing assembly 40, the solution dispensing unit 220 and the solution recovery unit 262. In step 476a, the obstacle avoidance plan determined in step 468a is put into action, and the scrubber executes a left turn and commences to drive around the obstacle 520. During this maneuver, the processor 304 is continually sensing the cleaning section for other obstacles. Thus, the processor 304 is continually looping back to step 420a of process 5A attempting to determine if further obstacles are encountered. In the present case, once the left turn is made, then the next time decision step 448a is executed, no obstacle will be sensed by the ultrasonic sensors 78, 86. Thus, in decision step 480a, a determination is made as to whether all obstacles have been avoided. Since there are no further obstacles in the vicinity of obstacle 520, step 484a is executed. In this step, the scrubber 10 attempts to regain the scrubbing path from which it deviated. Thus, the scrubber automatically drives to position L and then continues scrubbing. Of course, the loop from 420a through 484a is executed repeatedly with the most current ultrasonic sensor data during the drive to position L.

Once position L is reached, the scrubber 10 continues scrubbing along the dashed path until position M is reached. At this point, the ultrasonic overhang sensors 90 detect the overhang portion of the obstacle 540 and in decision step 440a, the processor 304 determines that the obstacle 540 cannot be cleared. More precisely, the processor 304 continually monitors the feedback from the overhang sensors 90 to determine if an object is within six feet of the floor and within two feet of the scrubber 10. Whenever these two conditions are true, as at position M, an overhang is encountered. That is, since no lower height portion of obstacle 540 is detected by the horizontal sensors 78, 82 within three feet horizontally in front of the scrubber 10 (which would cause the processor 304 to either stop the scrubber or initiate obstacle avoidance procedures), a portion of obstacle 540 is presumed to overhang the scrubbing path. Thus, in step 444a, the processor 304 again stops the scrubber 10, deactivates the scrubbing functional units and alerts the operator that assistance is required. In order for the scrubber 10 to continue, assume the operator places the scrubber 10 in manual mode and drives the scrubber to position N. At this position, the scrubber can be restarted in automatic mode and continues scrubbing along the dashed path once the processes 5A, 5B and 5C are again restarted from step 408. However, since position N is not directly in line with position M, the newly computed scrubbing path overlap is likely quite different from the overlap used in scrubbing up to position M. At position O, the scrubber 10 automatically turns to scrub the last path in section 500. Thus, as the processor 304 cycles through the loop from step 436b to step 472b of process 5B, the steps 436b, 440b and 444b are encountered. Thus, the scrubber 10 continues scrubbing while process 5B waits at step 444b until the scrubber is ten feet from the end of this path. However, at position P, the scrubber 10 now encounters the obstacle 540 at floor level. In decision be within three feet. In step 452a, the processor 304 determines that, in addition, the scrubber 10 is also against the wall 544. Thus, in step 456a the scrubber 10 once again stops, deactivates the scrubbing functional units and alerts the operator that assistance is required. Assuming the operator manually drives the scrubber 10 to position Q and places the scrubber 10 in automatic mode, it continues scrubbing once processes 5A, 5B and 5C are again restarted from step 408.

If the scrubber 10 continues automatically scrubbing from position Q to a point ten feet from wall 516 at position R, then step 448b is executed. Thus, the scrubber 10 changes direction and gradually veers away from the wall 544 in preparation for a turn at the end of the path. In step 452b, the scrubber 10 continues scrubbing until five feet from the end of the path. Once the scrubber 10 reaches this distance, the step 556b is executed, causing the solution flow to the scrub deck 42 to be shut off via the solenoid 232 of the solution dispensing unit 220. The scrubber 10, however, continues scrubbing until the end of the path is reached. At this point, decision step 460b is executed and a determination is made that the scrubber 10 is at the end of the last path. Thus, step 476b is next executed, where all cleaning functions are deactivated and the scrubber 10 turns reaching position S. Continuing, in decision step 480b, the processor 304 determines if the operator has set the option to clean multiple areas. If not, then the scrubber 10 either stops or drives to a predetermined location (such as position T) and stops, in either case subsequently signalling that the section has been scrubbed.

Alternatively, if the operator has indicated that multiple sections should be cleaned, then the processor 304 accesses a preprogrammed area linkage command file to determine if there is another or new section to be scrubbed. The command file includes the order of the section to be scrubbed as well as "point and drive" commands which provide navigation paths between sections by directing the scrubber 10 to predetermined locations based on triangulation from the reflective targets, and "map section change" commands which specify the navigation map used by the scrubber 10 in determining its position. Thus, in decision step 488b, the processor 304 determines if there is another section to be scrubbed by examining the command file and determining if there are commands which link the most recently scrubbed section with another section to be scrubbed. A "new" or different section to be cleaned can be defined as one in which a new x,y coordinate system is employed in determining scrubber 10 location and orientation and where the combination of the identifying reflective targets is different from each combination of targets in all other cleaning areas, as well as all cleaning functions being discontinued in moving from a section to the new section, which discontinuance is not due to an obstacle, a wall or some other reason that may cause a discontinuance in the same cleaning area. If not, then in step 492b, as in step 484b, the scrubber 10 either stops or drives to a predetermined location (such as position T) and stops, in either case subsequently signals that all sections have been scrubbed. If, instead, there are further sections to scrubber 10 automatically proceeds to the next section according to the commands in the section linkage command file. Thus, for instance, the scrubber 10 automatically drives from position S directly to position U due to a point and drive command. The scrubber 10 navigates to position U using the same laser triangulation mechanism used during the scrubbing process. However, no obstacle avoidance capabilities are used. If an obstacle is encountered, the scrubber 10 simply stops and indicates that operator assistance is required. When the scrubber 10 reaches position U, it then drives to position V by way of a second point and drive command. As shown in FIG. 6, the scrubber 10 is now in the section 504. In many circumstances, it is expedient for the processor 304 to automatically switch to a new internal navigation data map corresponding to the new section to be cleaned. Assuming this is the case for section 504, the next command in the area linkage command file is a map section change command such that while stopped at position V, the scrubber 10 changes maps from that of section 500 to a map of section 504. The scrubber 10 must then recalibrate its position according to the coordinates of the new map. In recalibrating, the actions of the scrubber 10 are similar to its actions upon entering the section 500. That is, the scrubber 10 does a laser scan of all visible targets, attempting to identify four targets that both identify the section as the one corresponding to the new map, and provide sufficient information for the scrubber 10 to calibrate its position within section 504. In some circumstances, the recalibration may fail. If this occurs, the scrubber 10 discontinues all further actions and indicates that operator assistance is required. Thus, from position V, the scrubber 10 either stops and requires operator help or drives to the start location and commences to scrub. It should also be understood that a "section" to be cleaned can be divided into a number of sub-parts or "areas," depending upon the layout or boundaries present. In such a case, instead of having more targets to define a new section, at least some of the same targets are used in cleaning different areas.

In conjunction with certain technology employed in controlling the positioning and orientation of the cleaning apparatus of the present invention, the subject matter of U.S. Pat. Nos. 4,751,658; 4,815,008; and 4,815,840 is hereby incorporated by reference.

With respect to obstacle avoidance, it should be understood from the foregoing that "obstacles" avoided by the cleaning apparatus disclosed herein can include both predetermined and determined or random obstacles. That is, the cleaning apparatus is properly controllable not only when an obstacle is known or predetermined, but also where an obstacle is determined to be in the section being cleaned after the cleaning apparatus has begun its cleaning operations in that area. In such a case, as previously explained, the cleaning apparatus is able to make the determination of the presence of the obstacle that was not known to be there and take appropriate action when the obstacle is encountered in the cleaning path.

It should also be understood that the cleaning apparatus housing and cleaning elements are comparable to those of a prior art manually controlled floor scrubbing machine marketed by the assignee of the present invention. However, this machine is not automated and could not be utilized without an operator. In addition, it should be appreciated that although the preferred embodiment discloses a floor scrubbing machine, other cleaning apparatuses can include the features of the present invention, including floor sweepers and polishers.

Based on the foregoing description, a number of salient features of the present invention are readily identifiable. A cleaning apparatus is disclosed that is automatically controlled during operation using reflective coded targets located at predetermined positions in the section to be cleaned. Positioning of the cleaning apparatus is controlled on a real-time basis, rather than being pre-programmed. Significantly, the cleaning apparatus is able to monitor both known and unknown obstacles that may be in the cleaning path whereby pre-programming of obstacles located in the cleaning paths along the floor surface section is not necessary. The rear end of the cleaning apparatus is taken into account when an obstacle is encountered adjacent to the sidewall of the area being cleaned during movement of the cleaning apparatus along its first path. Additionally, during movement of the cleaning apparatus along the first path of the floor surface section being cleaned, a determination is made that the cleaning apparatus is within a predetermined distance from an end wall so that the apparatus veers or gradually moves laterally to avoid contact between the rear end of the cleaning apparatus and the sidewall. To enhance desired cleaning, cleaning functions are discontinued at a predetermined distance before the cleaning apparatus reaches the end wall. The cleaning apparatus is able to move or link between two different cleaning areas using reflective coded targets.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiment described herein above, is further intended to explain the best mode presently known in practicing the invention and to enable others skilled in the art to utilize the invention as such, or other embodiments, and with various modifications required by their particular application or uses of the invention. It is intended that the appended claims be construed to include alternative embodiments to the extent permitted by the prior art.

What is claimed is:

1. An automated cleaning apparatus, comprising:
   cleaning means for cleaning a floor surface section;

housing mean-s connected to said cleaning means and having a length, a width and a height with one of (a) said length and height and (b) said width and height defining a substantially planar side to provide a non-cylindrical enclosure;

hardware navigation means for obtaining information relating to the position of at least one of said housing means and said cleaning means;

control means contained substantially only by said housing means for controlling movement of said housing means and the operation of said cleaning means, said control means including:

first means for determining position related information using said information from said hardware navigation means;

second means for avoiding obstacles in the path of said housing means and said cleaning means, wherein said second means is used in avoiding predetermined obstacles in the path of said housing means and said cleaning means, said second means also used in avoiding obstacles whose presence is determined during movement of said housing means and said cleaning means while the floor surface area is being cleaned;

third means for detecting whether obstacles are present to continued movement of said housing means and said cleaning means while the floor surface area is being cleaned;

driving means for moving said housing means and said cleaning means, said driving means being connected to said housing means and including first and second driven wheels positioned on opposite sides of said housing means along said length thereof.

2. An apparatus, as claimed in claim 1, wherein:
said cleaning means includes scrubber means located at a front end of said housing means and squeegee means located at a back end of said housing means and wherein said squeegee means has a length greater than said width of said housing means.

3. An apparatus, as claimed in claim 1, wherein:
said hardware navigation means includes a plurality of reflective targets for providing position information and a laser scanning assembly for transmitting light to said targets and for receiving reflected light from said targets.

4. An apparatus, as claimed in claim 3, wherein:
said first means includes software means for using information from said targets to determine the current position of said housing means.

5. An apparatus, as claimed in claim 3, further including:
fifth means for directing said housing means to a second floor surface section upon completion of the cleaning of a first floor surface area, wherein said housing means automatically traverses a linking path between said first and second cleaning section and along which linking path cleaning functions are discontinued, the second floor surface section having a combination of targets different from the combination of targets of the first floor surface section.

6. An apparatus, as claimed in claim 1, wherein:
said second means includes means for taking into account at least one of said length and said width in moving said housing means and said cleaning means to circumvent an obstacle when said second means detects an obstacle in the path of said housing means and said cleaning means.

7. An apparatus, as claimed in claim 6, wherein:
said second means includes means for taking into account the size of said cleaning means to avoid an obstacle when an obstacle is detected by said second means and wherein at least one dimension of said cleaning means is different from said housing means.

8. An apparatus, as claimed in claim 1, wherein:
said second means includes means for checking whether at least one of said housing means and said cleaning means is within a predetermined distance from a first boundary of the floor surface area and for stopping movement of said housing means and said cleaning means when said at least one thereof is within said predetermined distance.

9. An apparatus as claimed in claim 8, wherein:
said distance is about three feet.

10. An apparatus, as claimed in claim 1, wherein:
said second means includes means for checking whether at least one of said housing means and said cleaning means is within a predetermined distance from a second boundary of the floor surface section and for determining that said housing means and said cleaning means are to be moved gradually in a direction non-parallel to the current cleaning path thereof, said predetermined distance being greater than the distance at which cleaning functions are discontinued.

11. An apparatus, as claimed in claim 10, wherein:
said predetermine distance is about 10 feet.

12. An apparatus, as claimed in claim 10, wherein:
said gradual movement depends upon said housing means and said cleaning means being adjacent to a first boundary of the floor surface area during a first cleaning path taken by said housing means and said cleaning means.

13. An apparatus, as claimed in claim 1, wherein:
said second means includes means for determining whether one of said housing means and said cleaning means has reached at least a first predetermined distance from the end of a path along which said housing means and said cleaning means is moving, said first means further including means for discontinuing predetermined cleaning functions when said first predetermined distance is reached.

14. An apparatus, as claimed in claim 13, wherein:
said predetermined cleaning functions include application of a liquid solution to the floor and raising of scrubber means.

15. An apparatus, as claimed in claim 14, wherein:
said predetermined distance at which application of solution is discontinued is about 5 feet from the end of the path along which said housing means and said cleaning means is moving and said predetermined distance at which said scrubber means is raised is substantially at the end of the path.

16. An apparatus, as claimed in claim 1, wherein:
said third means includes upward and forward directed sensors for providing information to said control means wherein, when said upward sensor indicates a vertically extending obstacle within a predetermined distance from the floor surface area but said forward sensor indicates no obstacle within its range of detection, movement of said housing means is automatically stopped.

17. An apparatus, as claimed in claim 1, wherein:

said third means includes means for sensing a change in elevation of the floor surface area along which said housing means and said clearing means move.

18. An apparatus, as claimed in claim 17, wherein: said means for sensing includes a transmitter for transmitting infrared waves in front of said housing means and a receiver for receiving reflected waves using the floor surface section wherein the lack of a proper reflected wave indicates a change in elevation of the floor surface area.

19. An apparatus, as claimed in claim 1, wherein: said control means further includes means for determining the magnitude of an increment of movement in a direction substantially perpendicular to the direction of movement of said housing means and said cleaning means along a cleaning path during the cleaning operation, said increment resulting in overlap of floor surface area being cleaned between successive paths of cleaning with the amount of overlap depending upon at least the size of the floor surface section and the size of said cleaning means.

20. A method for controlling an automated cleaning machine, comprising:
providing a cleaning machine with first and second driven wheels, said cleaning machine including a front end and a rear end and having a length, a width and a height with said length having a different dimension from said width, with said length, width and height defining at least a first planar side, and said cleaning machine further including cleaning equipment for movement along a floor surface section to be cleaned;
allowing said cleaning machine to move without human operator intervention while the floor surface section is being cleaned but not permitting said cleaning machine to move in a substantially rearward direction;
regulating cleaning functions associated with said cleaning equipment while moving said cleaning machine;
identifying a current position of said cleaning machine while it is moving using targets and a laser scanning assembly;
detecting whether an obstacle is in the path of said cleaning machine;
determining whether an obstacle is avoidable whereby said cleaning continues to move, said step of determining includes taking into account at least one of said height and width of said cleaning machine in determining whether said rear end of said cleaning machine is able to avoid the obstacle and taking into account which direction said cleaning machine is to be moved when it is determined that the obstacle is avoidable; and
controlling separately movement of each of said first and second wheels in avoiding the obstacle.

21. A method, as claimed in claim 20, wherein: said step of controlling to avoid an obstacle includes reducing the amount of rotation of one of said first and second wheels in comparison to the other of said first and second wheels wherein which of said first and second wheels that has reduced rotation in comparison to the other wheel is determined using the position of the obstacle relative to the path of said cleaning machine.

22. A method, as claimed in claim 20, wherein: said step of allowing includes automatically checking whether said cleaning machine is within a predetermined distance from a first boundary in the floor surface area being cleaned and said step of controlling includes stopping movement of said cleaning machine when an obstacle is in the path of said cleaning machine and said cleaning machine is within said predetermined distance 23. A method, as claimed in claim 20, wherein: said step of allowing includes determining automatically whether an end boundary is within at least a first predetermined distance from said cleaning machine and said step of regulating includes discontinuing at least a first cleaning function when said cleaning machine is within said predetermined distance of the end boundary.

24. A method, as claimed in claim 23, wherein: said first cleaning function includes at least one of scrubbing the floor surface section and supplying a solution and said step of regulating includes at least one of automatically discontinuing the supply of solution when said cleaning machine is within about five feet from the end wall and automatically raising scrubber means when said cleaning machine is adjacent to the end boundary.

25. A method, as claimed in claim 20, wherein said step of allowing includes:
determining whether said cleaning machine is within a predetermined distance from an end wall in the path of said cleaning machine;
determining whether said cleaning machine is within a predetermined distance of a side wall;
causing said cleaning machine to turn in a substantially abrupt manner in which one wheel is held substantially fixed while another wheel rotates when said cleaning machine is not within said predetermined distance from the side wall and causing said cleaning machine to turn in a relatively gradual manner in which each of two wheels rotates when said cleaning machine is within said predetermined distance from the side wall, said gradual manner being sufficient to prevent said rear end of said cleaning machine from contacting the side wall.

26. A method, as claimed in claim 20, further comprising:
directing automatically said cleaning machine to move between first and second cleaning sections wherein said cleaning machine discontinues cleaning operations in moving between the first and second cleaning sections and in which the second cleaning section has a combination of said targets different from the combination of said targets in the second cleaning section.

27. A method, as claimed in claim 20, wherein: said step of detecting includes using at least two sensors to check in at least two different directions in order to obtain information as to whether an obstacle is present that extends a predetermined distance from the floor surface section and movement of said cleaning machine is to be stopped due to the obstacle.

* * * * *